Figure 1:
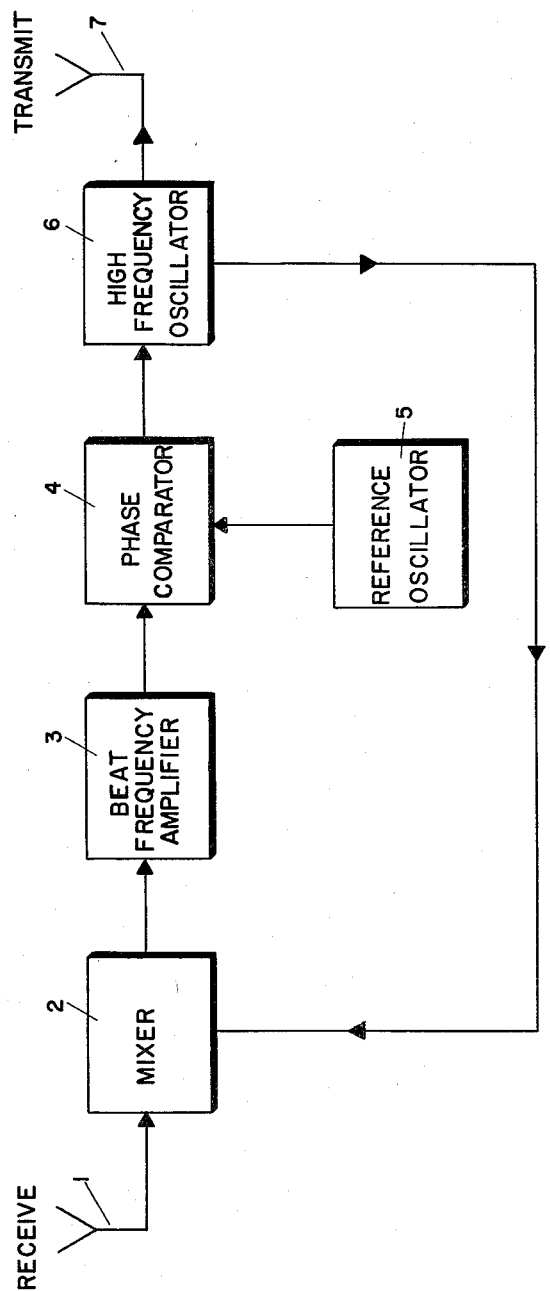

July 10, 1962 M. R. RICHMOND ETAL 3,044,061
REPEATER FOR COUNTERMEASURE RADAR SYSTEM
Filed Aug. 4, 1955 6 Sheets-Sheet 1

Martin R. Richmond
Kenneth Dollinger
*INVENTORS*

BY *Richard P. Schulze*

Attorney

Martin R. Richmond
Kenneth Dollinger
INVENTORS

Martin R. Richmond
Kenneth Dollinger
INVENTORS

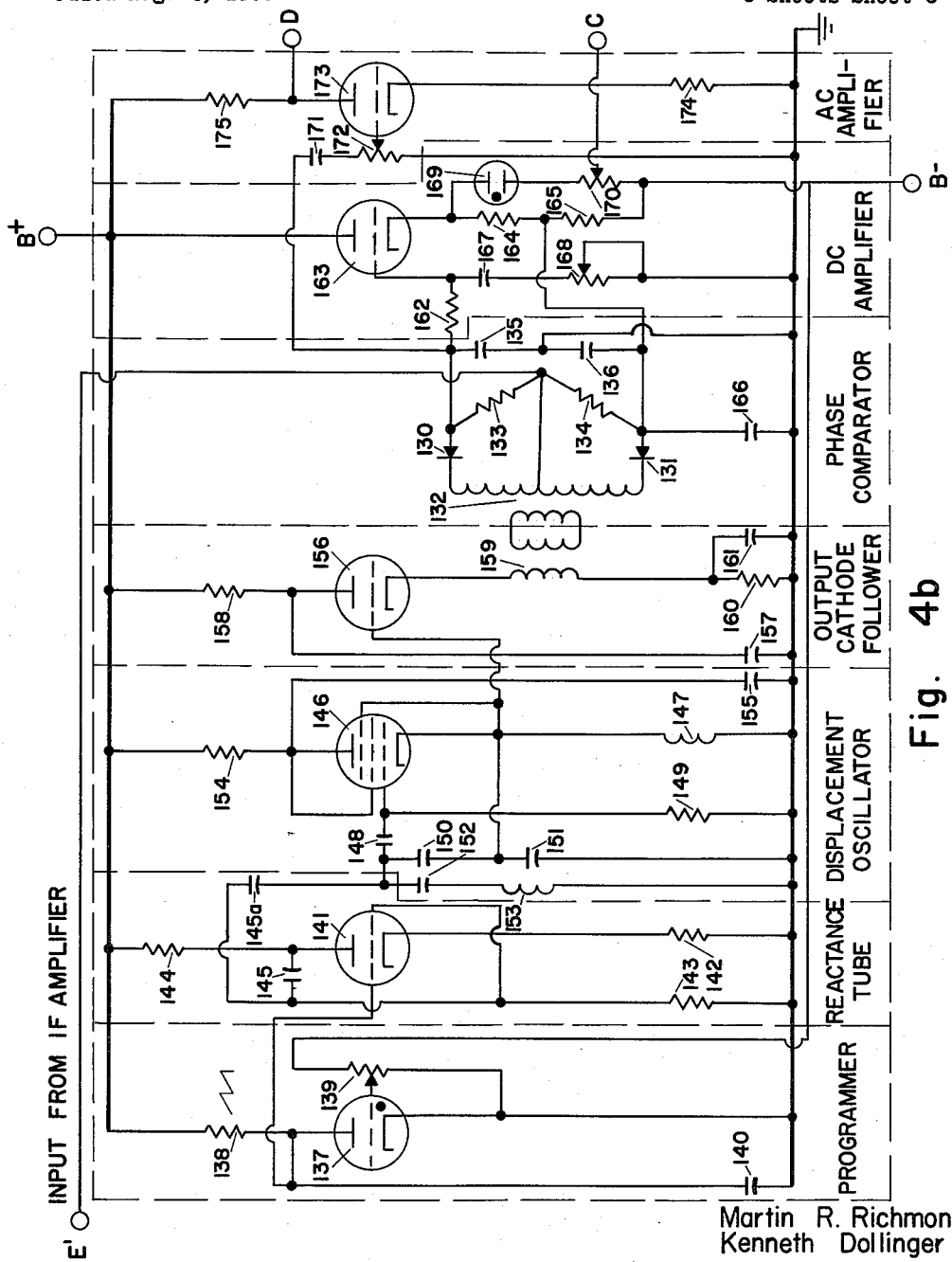

United States Patent Office 3,044,061
Patented July 10, 1962

3,044,061
REPEATER FOR COUNTERMEASURE
RADAR SYSTEM
Martin R. Richmond, Nashua, and Kenneth Dollinger, Derry, N.H., assignors to Sanders Associates, Incorporated, Nashua, N.H., a corporation of Delaware
Filed Aug. 4, 1955, Ser. No. 526,394
8 Claims. (Cl. 343—18)

The present invention relates to radio repeater stations. More particularly, the invention relates to radio repeater stations as used in countermeasure radar systems.

The present invention is a continuation-in-part of applicants' copending application for a "Radio Repeater System," Serial No. 458,075, filed September 20, 1954, and now abandoned.

It is frequently desirable to deceive and confuse a functioning radar system, that is, to provide ambiguous signals which the radar system is incapable of discriminating from true target indications. A system which is capable of so deceiving a radar system is termed "A Countermeasures Radar System" in the art. With particular regard to frequency modulated, continuous wave radar transmission, a countermeasures radar system of the type described must be capable of detecting the presence of a radar search beam and return the countermeasure beam at an enhanced carrier level.

It is therefor an object of the present invention to provide an improved countermeasures radar system for providing false target indications to an enemy radar set.

A further object of the invention is to provide an improved countermeasures radar system of the type described for regulating the frequency of a transmitted signal in accordance with the frequency of a received signal.

A further object of the invention is to provide a countermeasures radar system of the type described including means for varying the frequency of a transmitted signal relative to the frequency of a received signal.

A still further object of the invention is to provide a countermeasures radar system of the type described which utilizes a phase locking automatic frequency control circuit.

A still further object of the invention is to provide an improved method of signaling wherein a signal is transmitted at a frequency having a definite relation to the frequency of a received signal.

Other and further objects of the invention will be apparent from the following description of preferred embodiments thereof, taken in connection with the accompanying drawings.

In accordance with the present invention there is provided in a signaling system, the combination of means for transmitting a high frequency electromagnetic signal and means for receiving a high frequency electromagnetic signal. A means for heterodyning the transmitted and received signal is provided for producing a beat frequency voltage. Means are also provided for producing a reference frequency voltage. A means which is responsive to the beat and reference frequency voltages is provided for producing a control voltage proportional to variations in phase of the beat frequency voltage relative to the reference frequency voltage. Means are provided for controlling the transmitter means in accordance with the control voltage, to establish the frequencies of the transmitted and received signals with a frequency separation equal to the frequency of the reference frequency voltage.

In accordance with the present invention there is provided in a signaling system, the combination of means for transmitting a high frequency energy signal and means for receiving a high frequency energy signal. Means are provided for heterodyning the transmitted and received signals to produce a first beat frequency signal. Means are further provided for producing a reference signal having a predetermined frequency. Means for heterodyning the reference and first beat frequency signals are provided to produce a second beat frequency signal. Another means produces a displacement signal having a frequency characterized by the sum of the frequency of the reference signal and a predetermined differential displacement frequency. Means responsive to the displacement signal and the second beat frequency signal produce a control voltage proportional to variations in phase of the second beat frequency signal relative to the displacement signal. Means responsive to the control voltage control the transmitter means to establish the separation between the frequencies of the transmitted and received signals with a separation equal to the frequency of the differential displacement frequency.

In a countermeasures radar system embodying the present invention, means are provided for varying the separation between the frequencies of the transmitted and received signals in a predetermined manner.

Figure 2:
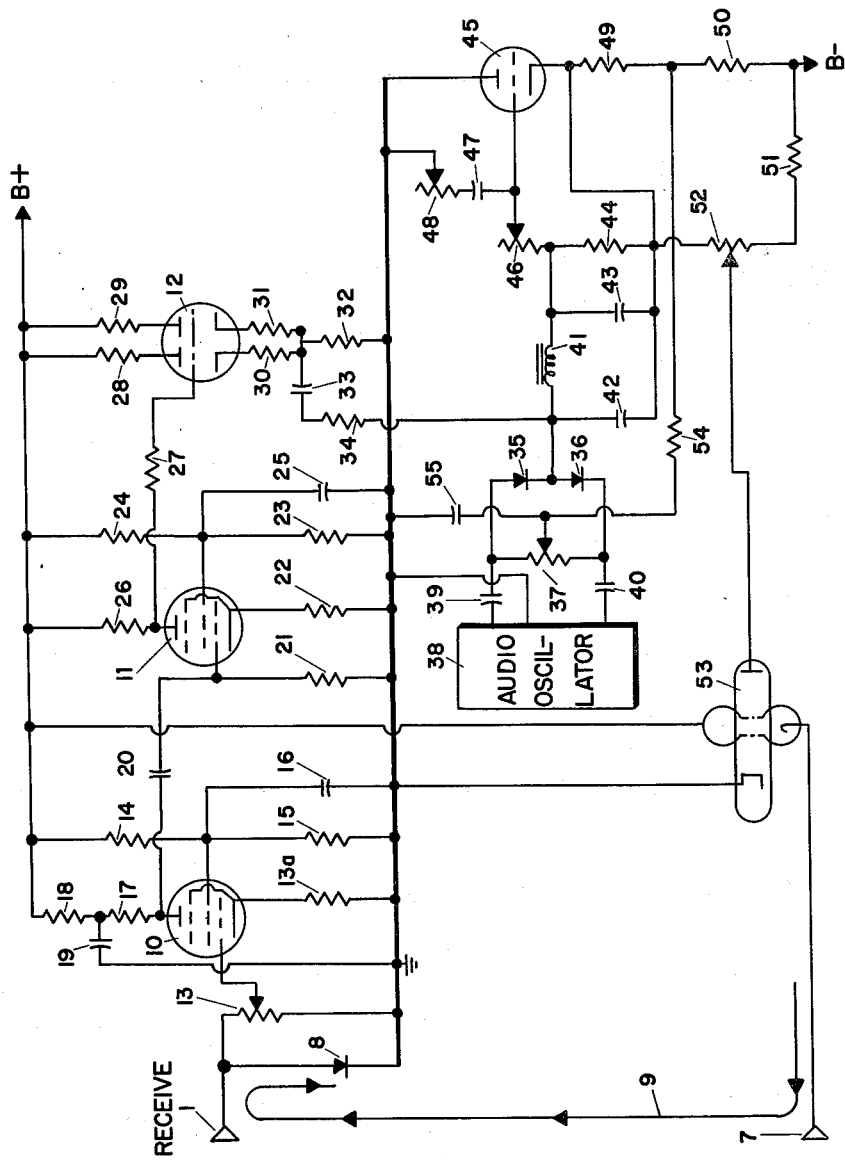
Figure 3:
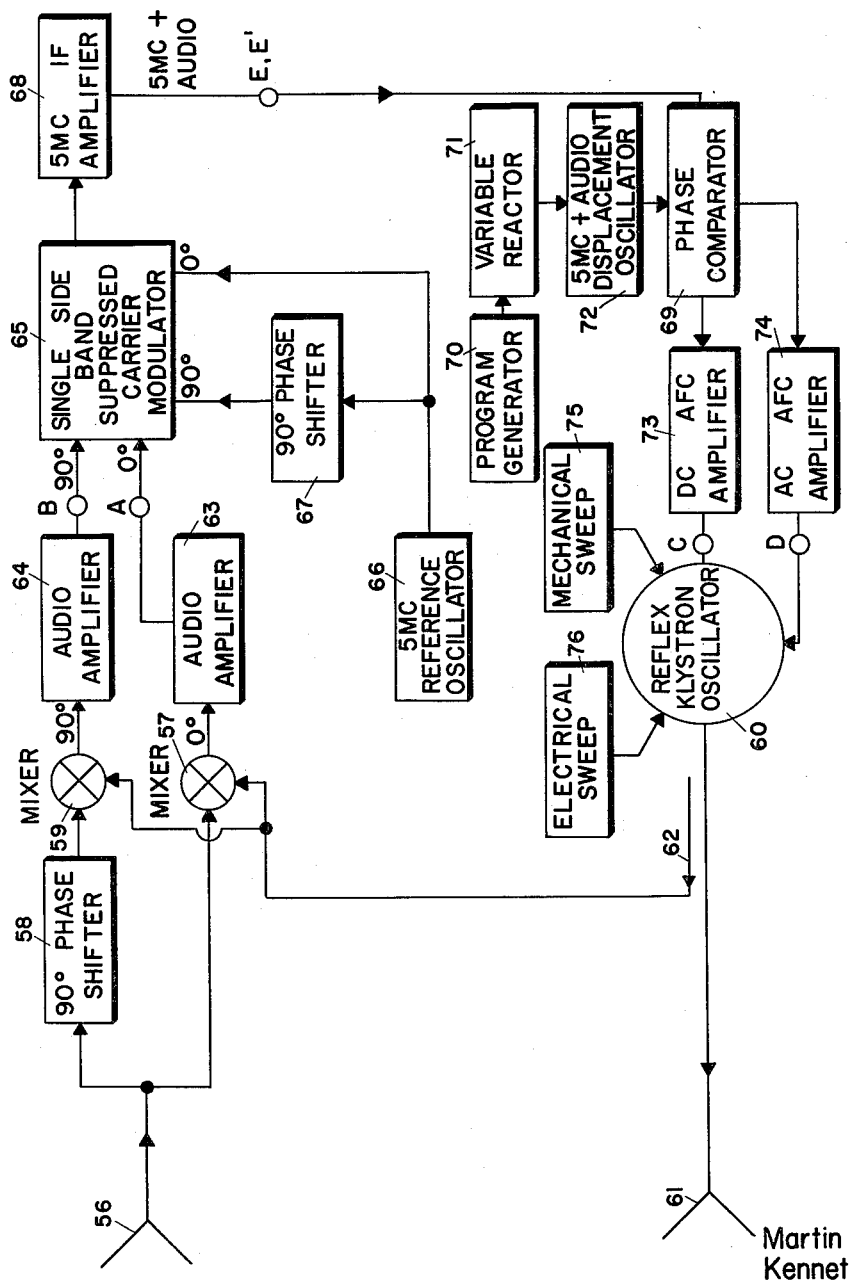
Figure 4A:
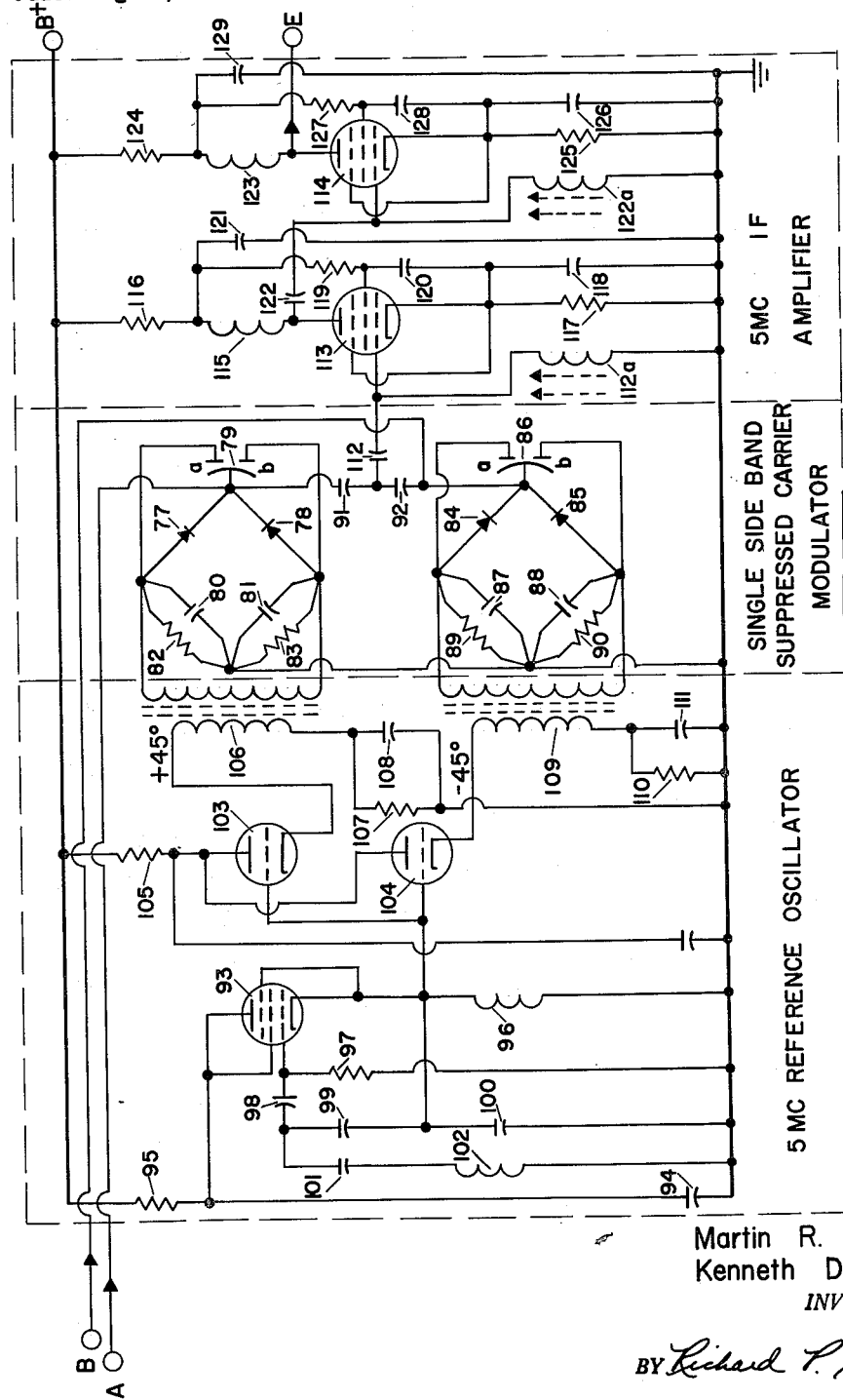
Figure 5:
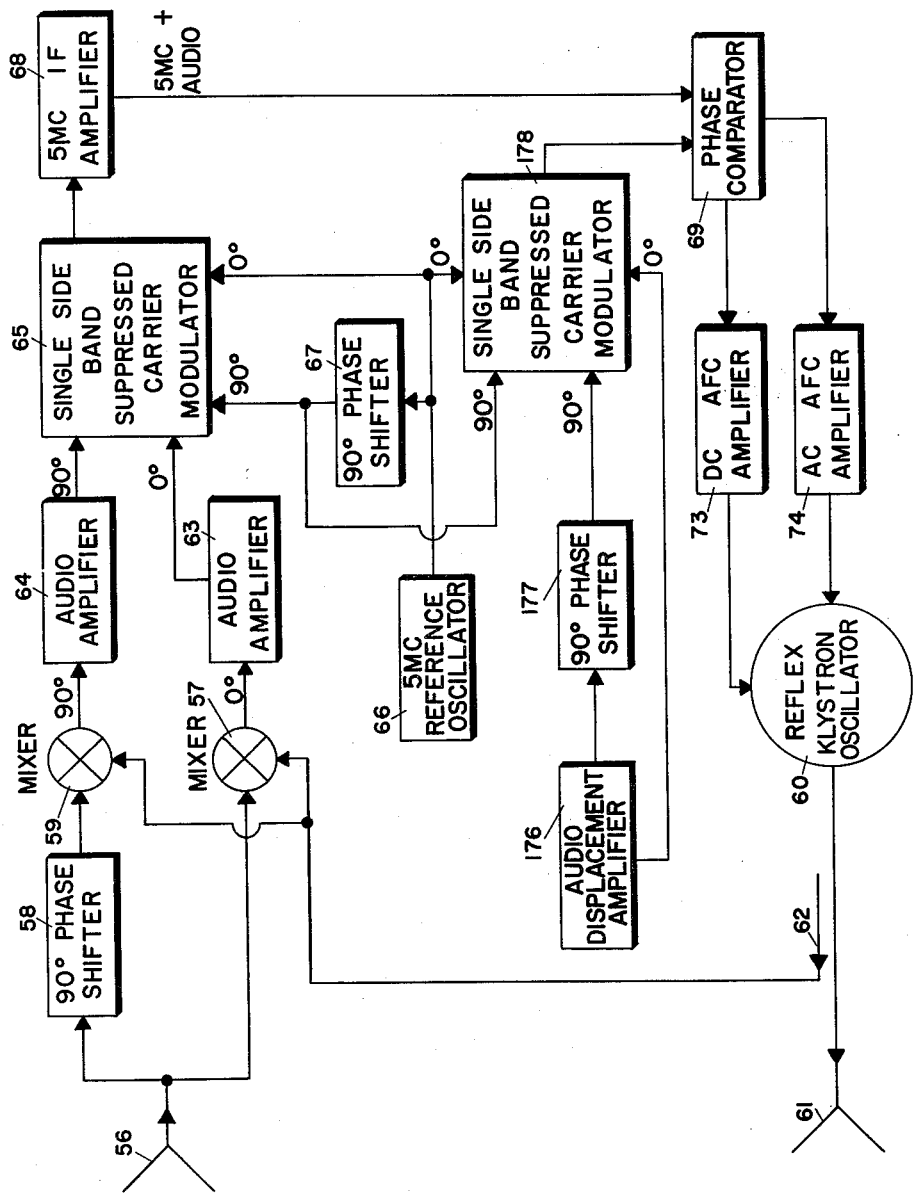

In the accompanying drawings:
FIG. 1 is a simplified, schematic block diagram of a signaling system embodying the present invention;
FIG. 2 is a schematic circuit diagram of a preferred embodiment of the system in FIG. 1;
FIG. 3 is a schematic block diagram of a countermeasures radar system embodying the present invention;
FIGS. 4a and 4b are substantially a schematic circuit diagram of the radar system in FIG. 3; and
FIG. 5 is a schematic block diagram of a modification of the system in FIG. 3.

Referring now to the drawings and with particular reference to FIG. 1, a receiving antenna 1 is adapted to receive an incoming signal which is coupled to a mixer 2 such as a crystal diode circuit. A high frequency oscillator 6, such as klystron, is coupled to a transmitting antenna 7. The oscillator 6 is also coupled to the mixer 2.

If the frequency of the output of the oscillator 6 differs from that of the received signal, the mixer 2 produces a beat frequency voltage in its output (for example, 100 cycles). The mixer 2 is coupled to a beat frequency amplifier 3, which in turn is coupled to a phase comparator circuit 4. A reference oscillator 5 provides a reference frequency voltage which is coupled to the comparator 4. The comparator 4 produces in its output a direct control voltage which is proportional to variations in phase of the beat frequency voltage relative to the reference frequency voltage. The control voltage of the comparator 4 is coupled to the oscillator 6 in such a manner as to effect a transmitted signal which differs in frequency from the received signal by the frequency of the reference frequency voltage.

Referring now to FIG. 2, there is here illustrated a schematic circuit diagram of a signaling system as used in a repeater station embodying the present invention. The receiving antenna 1 is coupled to the mixer circuit which comprises a crystal diode 8 and directional coupler 9. The diode 8 is coupled to the beat frequency amplifier which comprises a pentode tube 10, a pentode tube 11, a dual triode tube 12 and their associated components. The output of the diode 8 appears across a variable resistor 13 and is applied through its tap to the control grid of the tube 10. The suppressor grid and cathode of the tube 10 are connected together and, through a bias resistor 13a, to ground. The screen grid is connected through a voltage dropping resistor 14 to a source of relatively high positive voltage labeled B+ (for example, 250 volts D.C.). The voltage on the screen grid appears across a resistor 15 which is by-passed to ground by a capacitor 16. The plate of the tube 10 is connected through a plate load resistor 17 and decoupling resistor 18 to B+. The resistor 18, by-passed to ground by a capacitor 19, forms a decoupling circuit. The plate is also connected through a coupling capacitor 20 to the control grid of the tube 11. The control grid is connected to ground through a grid resistor 21. The cathode and suppressor grids are connected together and, through a cathode bias resistor 22, to ground. The voltage on the screen grid appears across a resistor 23 through a voltage dropping resistor 24 which is connected to the voltage source at B+. The resistor 23 is by-passed to ground by a capacitor 25. The plate of the tube 11 is connected through a plate load resistor 26 to B+. The plate of that tube is directly coupled through a voltage dropping resistor 27 to the control grids of a dual triode 12. The plates of the tube 12 are connected through voltage dropping resistors 28 and 29 to B+, respectively. The cathodes are connected through bias resistors 30 and 31, and, through a cathode load resistor 32, to ground. The signal which appears across the load resistor 32 is coupled by way of a capacitor 33 and dropping resistor 34 to the phase comparator circuit.

The comparator comprises a pair of crystal diodes 35 and 36 connected in series as shown and in parallel with a variable resistor 37. An audio oscillator 38, having a balanced output such as a Hewlett Packard Model 205AG, is coupled to one side of the half wave phase comparator through coupling capacitors 39 and 40. The junction point between the diodes 35 and 36 is connected to a filter comprising an inductance 41 and by-pass capacitors 42 and 43. The direct current voltage output of the comparator is applied across a grid resistor 44 and through a variable resistor 46 to the control grid of a triode tube 45 connected in a bootstrap cathode follower circuit. The remaining alternating current in the output of the comparator is coupled through the variable resistor 46, a filter capacitor 47 and variable resistor 48 to ground. The plate of the tube 45 is directly grounded and the cathode is connected through a voltage dropping resistor 49 and load resistor 50 to a source of relatively large negative voltage labeled B— (for example, —300 volts). The junction between resistors 49 and 50 is coupled by way of a filter resistor 54 and by-pass capacitor 55 to the tap on variable resistor 37. A voltage dividing circuit comprising a dropping resistor 51 and variable resistor 52 is connected in parallel with the resistors 49 and 50. The negative voltage output of the bootstrap cathode follower is applied through the variable tap of the resistor 52 to the repeller plate of a reflex klystron oscillator 53. The cathode of the oscillator is grounded and the anodes are connected to B+, as shown. Radio frequency energy is coupled from the resonant cavity of the klystron 53 to the transmitting antenna 7. The directional coupler 9 couples a portion of the transmitted energy to the diode 8 in the direction as indicated by the arrows.

In FIG. 3 a receiving antenna 56 is shown directly coupled to a mixer 57 and through a 90 degree phase shifter 58 to a second mixer 59. The reflex klystron oscillator 60 provides a source of transmitted microwave energy and operates, for example, at a frequency of 10 kmc.s. The klystron is coupled to a transmitting antenna 61. A directional coupler 62 couples a portion of the transmitted energy at a much lower level, for example, —30 db, to the mixers 57 and 59. The output of the mixers 57 and 59 are at quadrature as indicated and are applied to audio amplifiers 63 and 64, respectively. The outputs of the audio amplifiers 63 and 64 are also at quadrature as indicated and are applied to a single sideband suppressed carrier modulator 65. A 5 mc. reference oscillator 66 is coupled directly to the modulator 65 and through a 90 degree phase shifter 67 to apply two 5 mc. signals at quadrature to the modulator 65 as shown. The modulator 65 provides a composite beat frequency signal characterized by the sum of its input frequencies, for example, the 5 mc. plus audio. The signal thus derived is applied to a 5 mc. intermediate frequency amplifier 68. The output of the amplifier 68 is applied to a phase comparator 69. A program generator 70, such as a sweep circuit controls a variable reactor 71 which determines the frequency of oscillation of a 5 mc. plus audio displacement oscillator 72. The oscillator 72 is also coupled to the comparator 69. A direct current output control signal of the comparator 69 is applied to a direct current automatic frequency control (AFC) amplifier 73. The output of the amplifier 73 is then applied to the repeller plate of a klystron 60. An alternating current output of the comparator 69 is applied to an alternating current frequency control amplifier 74 which is applied to an anode of the klystron 60. The frequency of the klystron 60 is varied by a mechanical sweep 75 by physically varying the dimensions of its resonant cavity. An electrical sweep 76, operating in combination with the mechanical sweep 75, is coupled to the anode of the klystron 60 to vary its output frequency.

In the schematic diagram of FIG. 4 only that part of the system is shown which is connected between the outputs of the audio amplifiers 63 and 64, as coupled through the terminals indicated at A and B, respectively, and the input direct current and alternating current control signals to the klystron 60 as coupled through the terminals indicated at C and D respectively as shown in FIGS. 3 and 4.

Referring now to FIG. 4, the single sideband suppressed carrier modulator 65 comprises a pair of bridge circuits as indicated within the dashed lines. In each of the bridge circuits a pair of crystal diodes 77, 78 and 84, 85 respectively comprise two series connected legs of the bridge. The rotors of the differential capacitors 79 and 86 are connected to the junctions between the diodes 77 and 78 and the diodes 84 and 85, respectively. The stators 77a and 86a connect a section of each capacitor in parallel with the diode 77 and the diode 84 respectively as shown. Similarly, the stators 79b and 86b connect the other sections in parallel with the diodes 78 and 85 respectively as shown. The other two series legs o fthe respective bridges comprise the capacitors 80 and 81 in series parallel combination with the resistors 82 and 83 and the capacitors 87 and 88 in series parallel combination with the resistors 89 and 90 as shown. The junctions between the capacitors 80 and 81 and the capacitors 87 and 88 are connected together to ground as shown. The junctions between the diodes 77 and 78 and the diodes 84 and 85 are connected to capacitors 91 and 92 in series. The junction between the diodes 77 and 78 derives an input from the terminal indicated at A to the left as shown, and the junction between the diodes 84 and 85 derives an input from the terminal indicated at B to the left as shown.

The 5 mc. reference oscillator 66 essentially comprises the circuitry associated with the pentode amplifier 93. The pentode 93 is connected in a modified Colpitts circuit in which the plate and screen grid are connected together and by-passed to ground through a coupling capacitor 94. The plate and screen grid of that tube are also connected through a plate voltage dropping resistor 95 to a source of relatively high positive voltage labeled B+, for example, +250. The cathode is connected through a high frequency inductor 96 to ground as shown. The control grid is connected through a grid resistor 97 to ground and through a coupling capacitor 98 to a tuned circuit comprising series connected capacitors 99 and 100 which are in parallel with a capacitor 101 connected in series with a tuning coil 102, as shown. The output of the 5 mc. reference oscillator appears across a high frequency inductor 96 and is coupled to the control grids of a pair of triode amplifier tubes 103 and 104. Their plates are connected together through a voltage dropping resistor 105 to B+ as shown. A cathode of the tube 103 is coupled through the primary of a high frequency coupling transformer 106 in series with a bias circuit, including a resistor 107 in parallel with a capacitor 108, to ground as shown. The cathode of the tube 104 is similarly connected to the primary of a high frequency coupling transformer 109 in series with a second bias circuit, including a resistor 110 and a capacitor 111, to ground.

The secondaries of the transformers 106 and 109 provide the inputs for the bridge circuits of the single sideband suppressed carrier modulator as shown. The windings of the transformer 106 are so coupled as to provide a positive 45 degree phase shift in the output of its secondary. The windings of the transformer 109 are so coupled as to provide a negative 45 degree phase shift in the output of its secondary. It will be apparent, therefore, that the outputs of the secondaries of the transformers 106 and 109 are in quadrature as represented by the 90 degree phase shifter 67. The output of the single sideband modulator is applied from the junction between the capacitors 91 and 92 through a coupling capacitor 112 to a two-stage 5 mc. intermediate frequency amplifier.

The 5 mc. intermediate frequency amplifier 68 comprises a pair of pentode amplifier tubes 113 and 114 and their associated circuitry. The input signal appears across a high frequency inductor 112a connected between the control grid of the tube 113 and ground as shown. The plate of the tube 113 is connected through a high frequency inductor 115 and a voltage dropping resistor 116 to B+. The suppressor grid is connected to the cathode, as shown, and through a cathode bias resistor 117 to ground. The resistor 117 is by-passed by a capacitor 118 connected in parallel. The screen grid is connected through a voltage dropping resistor 119 to the junction between the resistor 116 and inductor 115. The screen grid is by-passed by a capacitor 120 connected between the screen grid and the cathode as shown. A by-pass capacitor 121 is connected in parallel with the resistor 119, the capacitor 120 and the capacitor 118 as shown.

The amplified signal is coupled from the plate of the tube 113 through a coupling capacitor 122 to the grid of the tube 114 and appears across a high frequency inductor 122a connected between the control grid of that tube and ground. The second amplifier circuit is similar to the first stage as shown and comprises a plate high frequency inductor 123 in series with a plate voltage dropping resistor 124, cathode bias resistor 125 and by-pass capacitor 126, screen grid dropping resistor 127 and by-pass capacitor 128, and by-pass capacitor 129 in parallel with the resistor 127 and capacitors 128 and 126. The output of the amplifier associated with the tube 114 is coupled from the plate of that tube to the terminal as indicated at E to the right as shown and the terminal is indicated at E' to the left as shown in FIG. 4b.

The phase comparator 69 comprises the bridge circuit in FIG. 4b which includes a pair of crystal diodes 130 and 131 in series with the secondary winding of an input transformer 132 and a pair of resistors 133 and 134 connected in series as shown. A pair of capacitors 135 and 136 are connected in series in parallel with the resistors 133 and 134 as shown. The junction between the capacitors 135 and 136 is connected to ground. The output of the intermediate frequency amplifier 68 is coupled through the terminal indicated at E' to the junction between the resistors 133 and 134, as shown.

The program generator 70 comprises the circuit associated with the triode gas discharge tube 137. The plate of the tube 137 is connected through a voltage dropping resistor 138 to B+. Its cathode is connected directly to ground as shown. Its control grid is connected to a sliding tap of a potentiometer 139 which is connected between a source of relatively high negative voltage labeled B— and ground as shown. A discharge capacitor 140 is connected from the plate of the tube 137 to ground. The output of the tube 137 is directly coupled to the grid of a triode reactor tube 141.

The variable reactor 71 comprises the tube 141 and its associated circuitry. The cathode of the tube 141 is connected through a cathode bias resistor 142 to ground. Its grid is connected through a grid resistor 143 to ground. The plate is connected through a voltage dropping resistor 144 to B+ and is coupled through a feedback capacitor 145 to the grid. The output of the tube 141 is coupled through a coupling capacitor 145a to the tuned grid circuit of a pentode oscillator tube 146.

The 5 mc. plus audio displacement oscillator 72 comprises the tube 146 and its associated circuitry. The displacement oscillator comprises essentially a modified Colpitts oscillator of conventional stable design. The cathode is connected through a high frequency inductor 147 to ground. The suppressor grid is connected to the cathode and the screen grid is connected to the plate as shown. A grid resistor 149 is connected between the control grid and ground. The control grid is coupled through a capacitor 148 to the tuned circuit comprising a pair of series connected capacitors 150 and 151 which in turn are connected in parallel with a series connected capacitor 152 and high frequency inductor 153. The plate is connected through a by-pass capacitor 155 to ground as shown. The output of the oscillator is taken across the high frequency inductor 147 and directly coupled to the grid of a triode cathode follower tube 156. Its plate is connected to RF ground through a by-pass capacitor 157 and to B+ through a voltage dropping resistor 158. Its cathode is connected through the primary of a high frequency coupling transformer 159 in series with a cathode bias resistor 160 which is connected in parallel with a by-pass capacitor 161 to ground as shown. The output of the cathode follower is coupled from its cathode circuit through the transformer 159 to the primary of the transformer 132 to provide a second input for the phase comparator. The junction between the resistor 133 and the diode 130 is coupled through a voltage dropping resistor 162 to the grid of a triode direct current amplifier tube 163.

The direct current AFC amplifier 73 comprises the tube 163 and its associated components as indicated. The plate of that tube is connected directly to B+. Its cathode is connected through a pair of series connected resistors 164 and 165 to ground. The junction between the resistor 134 and the diode 131 of the phase comparator is connected to the junction between the resistors 164 and 165. A capacitor 166 is connected from the junction between the resistors 164 and 165 to ground as shown. The grid of the tube 163 is connected through a series connected capacitor 167 and variable resistor 168 to ground. In parallel with the cathode resistors 164 and 165 is connected a neon glow discharge tube 169 which is series connected with a potentiometer 170 as shown. The direct voltage frequency error control signal output of the direct current amplifier is applied through the sliding tap of the potentiometer 170 through an output terminal as indicated at C to the repeller plate of the reflex klystron oscillator 60.

An alternating voltage error control signal output of the phase comparator is coupled from the junction between the resistors 133 and 162 through a capacitor 171 to appear across a potentiometer 172 which is connected to ground in the grid circuit of a triode amplifier tube 173, as shown.

The alternating current AFC amplifier 74 in FIG. 3 comprises the circuit associated with the tube 173. The sliding tap is connected to the grid of the tube 173. The cathode of the tube 173 is connected through a cathode bias resistor 174 to ground. Its plate is connected through a voltage dropping resistor 175 to B+. The output of the alternating current amplifier is directly coupled from the plate of the tube 173 through an output terminal as indicated at D to the anode of the reflex klystron oscillator 60.

The operation of a repeater system embodying the present invention will now be considered with particular reference to FIGS. 1 and 2. Assuming an incoming received carrier having a frequency, for example, of 10 kmc.s. and a transmitted carrier displaced in frequency by 1 kc. relative to the incoming carrier, the klystron oscillator 53 in FIG. 2 is then operating at a frequency of 10 kmc.s. plus 1 kc. Assuming a desired transmitted carrier displaced in frequency by 20 kc.s. relative to the incoming carrier, the system inherently functions to cause the frequency of operation of the klystron oscillator 53 to shift until the desired displacement of 20 kc.s. is reached.

A 10 kmc. carrier is received at the antenna 1 and coupled, for example, through a one-half inch by one inch rectangular wave guide to the mixer diode 8. By means of a directional coupler 9 a portion of energy characterized by 10 kmc.s. plus 1 kc. is also applied to the mixer diode 8.

A beat frequency voltage of 1,000 cycles appears across the resistor 13 which is then amplified by the amplifier tubes 10 and 11 and applied to the cathode follower impedance transformer tube 12. The amplified 1,000 cycle beat frequency voltage is coupled through capacitor 33 and resistor 34 to the phase comparator, at the junction of the comparator rectifiers 35 and 36. The audio oscillator 38 is set at 20 kc.s. to provide a reference frequency voltage (balanced output with grounded center tap as shown). The reference frequency voltage is coupled through capacitors 39 and 40 to the other side of the half wave phase comparator (appearing across resistor 37). The bootstrap cathode follower circuit comprising the triode 45 and its associated components functions ordinarily to maintain a reasonably constant negative voltage on the repeller plate of the klystron 53. In this instance, the phase comparator functions in such a manner as to produce a direct current error signal voltage when the reference and beat frequency voltages deviate from quadrature. The direct current error signal is superimposed on the negative voltage normally applied to the repeller plate in such manner as to vary the frequency of transmission in accordance with the error signal control voltage as produced by the phase comparator. The phase comparator continues to provide a control voltage until the frequency of transmission has been shifted 20,000 cycles from that of the received carrier.

When the transmitted carrier signal tends to drift relative to the received carrier signal, the phase comparator 4 senses a phase difference therebetween. The comparator produces a null signal when the carrier signals are locked in phase; hence, the carriers are in quadrature at that time. A shift in phase toward, for example, a 0 degree phase relation causes the comparator 4 to produce a positive direct voltage error control signal which effects a decrease in the frequency of operation of the klystron oscillator 53. Conversely, a shift toward 180 degree phase relation produces a negative error signal which tends to increase the frequency of operation of the oscillator to compensate for the disturbance.

The operation of a countermeasures radar system utilizing the present invention will now be described with particular reference to FIGS. 3 and 4. An incoming carrier frequency signal of, for example 10 kmc.s., is received by the receiving antenna 56. The output of the antenna 56 is divided into two channels in which the energies are at quadrature as indicated. An output of the antenna 56 is directly coupled to the mixer 57. Another output of the antenna 56 is phase shifted 90 degrees by the shifter 58 which is coupled to the mixer 59. Assuming the reflex klystron oscillator to be operating at a frequency, for example, of 10 kmc.s. plus 50 cycles, a portion of its output is coupled through the directional coupler 62 to the mixers 57 and 59. The input energies to the mixers 57 and 59 are heterodyned particularly to provide a first beat frequency in the audio range, here for example 50 cycles. The other beat frequencies are readily filtered out by a low-pass filter incorporated in the amplifiers 63 and 64.

The amplified 50 cycle outputs of the amplifiers 63 and 64 are applied in quadrature as indicated through terminals indicated at A and B to the single sideband suppressed carrier modulator 65. The 5 mc. reference oscillator 66 applies a pair of 5 mc. input frequency signals to the modulator 55 in quadrature through the 90 degree phase shifter 67. In the embodiment of the shifter 67 as illustrated in FIG. 4, the 90 degree phase shifter is in fact realized by adjusting the coupling between the windings of the transformers 106 and 109 whereby the output of one transformer is advanced in phase by 45 degrees and the other output retarded in phase by 45 degrees to provide the two reference signal inputs at quadrature.

The single sideband suppressed carrier modulator is quite conventional in its operation and provides an output intermediate frequency signal or second beat frequency signal which is characterized only by the sum of the input frequencies, here 5 mc. plus 50. The output intermediate frequency signal as amplified by the amplifier 68 is coupled through the terminals indicated at E and E', in FIGS. 3 and 4, to the phase comparator 69. The 5 mc. plus audio displacement oscillator 72 provides a displacement signal having a frequency characterized by the sum of the 5 megacycles reference signal and a desired differential displacement frequency. Here, for example, the displacement frequency desired is 100 cycles; that is, it is desired to have the transmitted microwave energy separated in frequency from the incoming energy by 100 cycles. More particularly, the differential displacement frequency is the difference frequency by which the received signal is intended to be displaced from that of the transmitted signal. As will be described in greater detail below, the frequency of the transmitted signal is changed in response to the difference between the differential displacement frequency and the actual difference frequency between the transmitted and received signals. In the example chosen here, the desired differential displacement frequency is 100 cycles and the actual difference frequency is 50 cycles. There is, therefore, an error signal of 50 cycles. In response to this error the transmitted signal is changed in frequency until a displacement between the frequencies of the received and transmitted signals of 100 cycles is achieved. In countermeasures equipment, however, it is desirable to vary the displacement frequency in order to provide false target indications to an enemy radar. Thus, the program generator 70 provides, for example, a sawtooth voltage output which is applied to the variable reactor 71 to vary its reactance, which is effectively in parallel with the tuned circuit of the oscillator 72 as particularly illustrated in FIG. 4b. The generator 70 provides a sawtooth voltage which recurs, for example at the rate of one cycle per second, in response to the difference frequency between the outputs of the amplifier 68 and the oscillator 72.

In response to the output displacement signal from the oscillator 72 and the intermediate frequency signal output of the amplifier 68, the phase comparator 69 provides an error control signal in its output which is characterized by both an alternating and direct current component. The direct current component is applied to the direct current automatic frequency control amplifier 73 which is coupled through the terminal as indicated at C to the repeller plate of the reflex klystron 60. The alternating current component is amplified by the amplifier 74 and applied through the output terminal as indicated at D to the anode of the reflex klystron oscillator 60.

From the above description it will be apparent that automatic frequency control takes place by virtue of the servo control provided by the entire phase locking loop. The system inherently functions to produce an error signal from the phase comparator so long as a difference frequency exists between the output of the amplifier 68 and the oscillator 72. Consequently, as the output of the oscillator 72 constantly varies in frequency, the comparator 69 provides a continuing error signal. In this manner the transmitted carrier signal varies in frequency relative to the incoming carrier in a predetermined way.

The mechanical sweep 75 and the electrical sweep 76 in combination vary the frequency of operation of the klystron oscillator 60 over a relatively wide range, for example 9 to 11 kmc.s., to permit detection of enemy radar systems operating in that range. In a typical application, means are provided for suspending the operation of the electrical and mechanical sweeps 75 and 76 in response to a signal from an enemy radar set.

In the modification of the system illustrated in FIG. 5, an output of the 5 mc. reference oscillator 66 and the 90 degree phase shifter 67 are applied in quadrature to another single sideband suppressed carrier modulator 178. An audio displacement oscillator 176 provides a displacement signal in the range of, for example, 100 to 20,000 cycles, directly to the modulator 178 and is coupled through a 90 degree phase shifter 177 to provide a second input to the modulator 178 in quadrature as indicated. The modulator 178 provides an output displacement signal which is characterized by the sum of the frequencies provided by the reference oscillator 66 and the displacement oscillator 176. The outputs of the modulator 178 and the amplifier 68 are then applied to the phase comparator 69 to provide control signals for the reflex klystron 60 as described above. The frequency of the displacement oscillator 176 may be varied to encode the transmitted signal as previously mentioned in connection with the program generator and displacement generator in FIGS. 3 and 4. It will be noted that here the reference oscillator 66 provides a common reference frequency for both the unknown difference frequency between the received and transmitted signals and the desired displacement frequency therebetween.

In a countermeasures radar system embodying the circuit illustrated in FIG. 4, which was actually constructed and tested, components of the following values or description were utilized: differential capacitors 79 and 86—25 micromicrofarads; capacitors 80, 81, 87, 88, 99, 100, 150 and 151—510 micromicrofarads; resistors 82, 83, 89, 90 and 144—10,000 ohms; capacitors 91 and 92—180 micromicrofarads; vacuum tubes 93 and 146—686; capacitors 94, 108, 111, 155, 157 and 161—.05 microfarad; resistors 95, 105, 116, 124, 142, 143 and 154—1,000 ohms; inductor 96—5 millihenries; resistors 97 and 149—110,000 ohms; capacitors 98, 135, 136 and 148—100 micromicrofarads; capacitors 101 and 152—30 microfarads; inductors 102 and 147—wound to resonate at 5 mc.s.; vacuum tubes 103 and 104—12AU7 dual triode; transformers 106, 109, 132 and 159—wound to pass 5 mc.s.; resistors 107, 110, 160 and 175—2,000 ohms; capacitor 112—9 micromicrofarads; inductors 112a, 115, 122a and 123—4 to 6 millihenries; vacuum tubes 113 and 114—6AK5; resistor 117—220 ohms; capacitors 118, 120 and 128—.005 micromicrofarad; resistors 119 and 127—56,000 ohms; capacitors 121, 126 and 129—.01 microfarad; capacitor 122—200 micromicrofarads; resistor 125—270 ohms; diodes 130 and 131—1N34; resistors 133, 134 and 165—51,000 ohms; gas discharge tube 137—64; resistors 138 and 162 and potentiometer 172—1 megohm; potentiometer 139—470,000 ohms; capacitors 140 and 166—.5 microfarad; capacitor 145—10 micromicrofarads; inductor 153—wound to resonate at 5.001 mc.s.; vacuum tube 156 and triode 121—½ 12AU7 dual triode; vacuum tube 163—½ 12AV7 dual triode; resistor 164—470 ohms; capacitor 167—1 microfarad; potentiometer 168—250 ohms; neon tube 169—NE2; potentiometer 170—50,000 ohms; capacitor 171—.25 microfarad; vacuum tube 173—12AV7; and resistor 174—240 ohms.

From the above description the application of the present invention to countermeasure radar systems is quite clear. It will be apparent that signaling systems embodying the present invention have many applications in the art of radio frequency control.

While there has been hereinbefore described what are at present considered preferred embodiments of the invention, it will be apparent that many and various changes and modifications may be made with respect to the embodiments illustrated, without departing from the spirit of the invention. It will be understood, therefore, that all those changes and modifications as fall fairly within the scope of the present invention, as defined in the appended claims, are to be considered as a part of the present invention.

What is claimed is:

1. In a signaling system, the combination of means for transmitting a high frequency radio signal; means for receiving a remote high frequency radio signal; means for heterodyning the transmitted and received signals to produce a first beat frequency signal; means for producing a reference signal having a predetermined frequency; means for heterodyning said reference and said first beat frequency signals to produce a second beat frequency signal; means producing a displacement signal having a frequency characterized by the sum of the frequency of said reference signal and a predetermined differential displacement frequency, said reference frequency being substantially greater than said differential displacement frequency; means responsive to said displacement signal and said second beat frequency signal for producing a control voltage proportional to variations in phase of said second beat frequency signal relative to said displacement signal; and means for controlling said transmitter means in accordance with said control voltage to establish a separation between the frequencies of said transmitted and received signals equal to the frequency of said differential displacement frequency.

2. In a signaling system, the combination of means for transmitting a high frequency radio signal; means for receiving a remote high frequency radio signal; means for heterodyning the transmitted and received signals to produce a first beat frequency signal; means for producing a reference signal having a predetermined frequency; means for heterodyning said reference and said first beat frequency signals to produce a second beat frequency signal; means for producing a displacement signal having a frequency characterized by the sum of the frequency of said reference signal and a predetermined differential displacement frequency, said reference frequency being substantially greater than said differential displacement frequency; means for heterodyning said reference and displacement frequency signals to produce a third beat frequency signal; means responsive to said second and third beat frequency signals to produce a control voltage proportional to variations in phase of said second beat frequency signal relative to said third beat frequency signal; and means for controlling said transmitter means in accordance with said control voltage to establish a separation between the frequencies of said transmitted and received signals equal to the frequency of said displacement frequency.

3. In a signaling system, the combination of means for transmitting a high frequency radio signal; means for receiving a high frequency radio signal; means for heterodyning the transmitted and received signals to produce a first beat frequency signal; means for producing a reference signal having a predetermined frequency; means for heterodyning said reference and said beat frequency signals to produce a second beat frequency signal; means for producing a displacement reference signal differing from said first reference signal by a predetermined differential displacement frequency, said reference frequency being substantially greater than said differential displacement frequency; means responsive to said displacement signal and said second beat frequency signal for producing a control voltage proportional to variations in phase of said second beat frequency signal relative to said displacement signal; and means for controlling said transmitter means in accordance with said control voltage to establish a separation between the frequencies of said transmitted and received signals equal to said displacement frequency.

4. In a signaling system, the combination of means for transmitting a high frequency radio signal; means for receiving a remote high frequency radio signal; means for heterodyning the transmitted and received signals to produce a first beat frequency signal; means for producing a reference signal having a predetermined frequency; means for heterodyning said reference and said first beat frequency signal to produce a second beat frequency signal; means for producing a displacement signal having a frequency characterized by the sum of the frequency of said reference signal and a predetermined differential displacement frequency, said reference frequency being substantially greater than said differential displacement frequency; means responsive to said displacement signal and said second beat frequency signal to produce a control voltage proportional to variations in phase of said second beat frequency signal relative to said displacement signal; means for controlling said transmitter means in accordance with said control voltage to establish a separation between the frequencies of said transmitted and received signals equal to said displacement frequency; and means for varying the frequency of said displacement signal to encode said transmitted signal.

5. In a signaling system, the combination of means for transmitting a high frequency radio signal; means for receiving a remote high frequency radio signal; means for heterodyning the transmitted and received signals to produce a first beat frequency signal; means for producing a reference signal having a predetermined frequency; means for heterodyning said reference and said first beat frequency signals to produce a second beat frequency signal; means for producing a displacement signal having a frequency characterized by the sum of the frequency of said reference signal and a predetermined differential displacement frequency, said reference frequency being substantially greater than said differential displacement frequency; means responsive to said displacement signal and said second beat frequency signal to produce a control voltage proportional to variations in phase of said second beat frequency signal relative to said displacement signal; means for controlling said transmitter means in accordance with said control voltage to establish a separation between the frequencies of said transmitted and received signals therebetween equal to said displacement frequency; and means for controlling said transmitter to vary the frequency of said transmitted signal a predetermined amount to enable said system to respond to received signals having an undetermined frequency.

6. In a signaling system, the combination of: a source of variable frequency signal; a source of reference frequency signal having a frequency substantially greater than the frequency of said variable source; mixing means coupled to said sources for heterodyning said variable and said reference frequency signals and including selection means for selecting a particular sideband frequency signal; a displacement signal source for providing a displacement signal at a frequency with a predetermined differential displacement frequency relative to said reference frequency signal, said reference frequency being substantially greater than said differential displacement frequency; comparator means coupled to said displacement signal source and said mixing means to provide a control voltage; and means responsive to said control voltage for adjusting said variable frequency source to provide a signal having a predetermined relation to said displacement frequency signal.

7. In a signaling system, the combination of: a source of variable frequency signal; a source of reference frequency signal having a frequency substantially greater than the frequency of said variable source; mixing means coupled to said sources for heterodyning said variable and said reference frequency signals and including selection means for selecting a particular sideband frequency signal; displacement signal source for providing a displacement signal at a frequency with a predetermined differential displacement frequency relative to said reference frequency signal, said reference frequency being substantially greater than said differential displacement frequency; comparator means coupled to said displacement signal source and said mixing means to provide a control voltage proportional to variations in phase of said sideband signal relative to said displacement signal; and means responsive to said control voltage for adjusting said variable frequency source to provide a signal having a predetermined relation to said displacement frequency signal.

8. In a signaling system, the combination of: transmitter means for transmitting a high frequency radio signal including a variable frequency oscillator; receiving means for receiving remote high frequency radio signals; a first mixing means coupled to said transmitter and receiver for heterodyning the transmitted and received signals to produce a first beat frequency signal; a source of reference signal having a frequency substantially greater than the frequency of said first beat frequency signal; a second mixing means coupled to said first mixing means and said reference frequency source for heterodyning said beat frequency and said reference frequency signals and including selection means for selecting a particular sideband frequency signal; a displacement signal source for providing a displacement signal at a frequency with a predetermined differential displacement frequency relative to said displacement, said reference frequency being substantially greater than said differential displacement frequency; comparator means coupled to said displacement signal source and said second mixing means to provide a control voltage proportional to variations in phase of said sideband signal relative to said displacement signal; and means responsive to said control voltage for adjusting said variable frequency oscillator to provide a transmitted signal having a predetermined frequency relative to said received signal.

References Cited in the file of this patent

UNITED STATES PATENTS

| | | |
|---|---|---|
| 2,344,813 | Goldstine | Mar. 21, 1944 |
| 2,465,341 | Altovsky | Mar. 29, 1949 |
| 2,494,327 | Beurtheret | Jan. 10, 1950 |
| 2,550,519 | Bataille | Apr. 24, 1951 |
| 2,644,138 | Bond | June 30, 1953 |